(12) United States Patent
Neagu et al.

(10) Patent No.: US 10,576,721 B2
(45) Date of Patent: Mar. 3, 2020

(54) BARRIER FILM OR SHEET AND LAMINATED PACKAGING MATERIAL COMPRISING THE FILM OR SHEET AND PACKAGING CONTAINER MADE THEREFROM

(71) Applicant: Tetra Laval Holdings & Finance S.A., Pully (CH)

(72) Inventors: Cristian Neagu, Epalinges (CH); Pierre Fayet, Lausanne (CH)

(73) Assignee: Tetra Laval Holdings & Finance S.A., Pully (CH)

( * ) Notice: Subject to any disclaimer, the term of this patent is extended or adjusted under 35 U.S.C. 154(b) by 49 days.

(21) Appl. No.: 15/771,218

(22) PCT Filed: Oct. 25, 2016

(86) PCT No.: PCT/EP2016/075697
§ 371 (c)(1),
(2) Date: Apr. 26, 2018

(87) PCT Pub. No.: WO2017/072124
PCT Pub. Date: May 4, 2017

(65) Prior Publication Data
US 2018/0319143 A1    Nov. 8, 2018

(30) Foreign Application Priority Data
Oct. 29, 2015  (EP) .................................... 15192203

(51) Int. Cl.
*B32B 29/02* (2006.01)
*B32B 27/10* (2006.01)
*B32B 27/32* (2006.01)

(52) U.S. Cl.
CPC .............. *B32B 29/02* (2013.01); *B32B 27/10* (2013.01); *B32B 27/32* (2013.01);
(Continued)

(58) Field of Classification Search
CPC ............ B32B 2262/04; B32B 2262/06; B32B 2307/7244; B32B 2307/7265;
(Continued)

(56) References Cited

U.S. PATENT DOCUMENTS

2008/0102222 A1   5/2008  Fujinawa et al.
2012/0251818 A1*  10/2012 Axrup ..................... B32B 27/10
                                                        428/326
2016/0130056 A1*  5/2016  Nishijima ............... B32B 5/245
                                                        442/153

FOREIGN PATENT DOCUMENTS

EP    2 644 371 A1    10/2013
JP    2009 155384 A    7/2009
(Continued)

OTHER PUBLICATIONS

Extended European Search Report for European Application No. 15192203.6 dated Apr. 12, 2016 in 9 pages.
(Continued)

*Primary Examiner* — Camie S Thompson
(74) *Attorney, Agent, or Firm* — Knobbe, Martens, Olson & Bear LLP

(57) ABSTRACT

Barrier films or sheets comprising cellulose nanofibrils and laminated packaging materials comprising such films, in particular for liquid food packaging, are disclosed. A packaging container comprising the laminated packaging material or being made from the laminated packaging material, in particular a packaging container for liquid food packaging, are also disclosed.

13 Claims, 13 Drawing Sheets

Figure 1A:
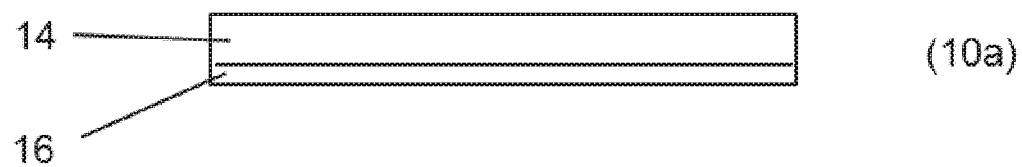

(52) U.S. Cl.
CPC ....... *B32B 2255/02* (2013.01); *B32B 2255/20* (2013.01); *B32B 2255/205* (2013.01); *B32B 2262/04* (2013.01); *B32B 2262/06* (2013.01); *B32B 2307/7242* (2013.01); *B32B 2307/7244* (2013.01); *B32B 2307/7265* (2013.01); *B32B 2439/62* (2013.01); *B32B 2439/70* (2013.01)

(58) Field of Classification Search
CPC .... B32B 2307/7242; B32B 2307/7246; B32B 2439/62; B32B 2439/70; B32B 2439/80; B32B 29/02; B32B 5/022; B32B 5/024; B32B 27/10; B32B 27/32; B32B 2255/02; B32B 2255/50; B32B 2255/205; B65D 65/42; D21H 11/18; D21H 19/34; D21H 27/10; Y10T 156/10; Y10T 428/253
USPC ............... 428/297.4, 292.1, 304.4, 532, 326; 442/153; 427/29, 248.1, 412; 156/280, 156/60

See application file for complete search history.

(56) References Cited

FOREIGN PATENT DOCUMENTS

| | | |
|---|---|---|
| JP | 2011 073174 A | 4/2011 |
| WO | WO 2009/153225 A1 | 12/2009 |
| WO | WO 2011/078770 A1 | 6/2011 |
| WO | WO 2013/041469 A1 | 3/2013 |
| WO | WO 2015/011899 A1 | 1/2015 |

OTHER PUBLICATIONS

International Search Report for Application No. PCT/EP2016/075697 dated Jan. 25, 2017 in 3 pages.

* cited by examiner

BARRIER FILM OR SHEET AND LAMINATED PACKAGING MATERIAL COMPRISING THE FILM OR SHEET AND PACKAGING CONTAINER MADE THEREFROM

TECHNICAL FIELD

The present invention relates to barrier films having a gas barrier layer comprising cellulose nanofibrils and to laminated packaging materials comprising such films, in particular intended for liquid food packaging.

The invention also relates to packaging containers comprising the laminated packaging material or being made of the laminated packaging material, in particular to a packaging container intended for liquid food packaging.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk core layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the core layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

A layer of an aluminium foil in the packaging laminate provides gas barrier properties quite superior to most polymeric gas barrier materials. The conventional aluminium-foil based packaging laminate for liquid food aseptic packaging is still the most cost-efficient packaging material, at its level of performance, available on the market today.

Any other material to compete must be cost-efficient regarding raw materials, have comparable food preserving properties and have a comparably low complexity in the converting into a finished packaging laminate.

Among the efforts of developing non-aluminium-foil materials for liquid food carton packaging, there has been a general incentive towards developing pre-manufactured films or sheets having high barrier properties, i.e. not only oxygen and gas barrier but also water vapour, chemical or aroma-substance barrier properties, from expensive materials and material combinations, however often not sustainable from an environmental and sourcing point of view.

An important driving force behind developing non-aluminium-foil based barrier packaging materials, is to use renewable raw materials as far as possible, in order to lower the total emitted $CO_2$ content connected to the materials used and to the manufacturing process of the packaging material.

A very interesting such alternative non-foil, as well as renewable, barrier material would be so called cellulose nanofibrils, CNF, also commonly named as micro- or nano-fibrillar cellulose (MFC, NFC).

CNF is normally produced by a method having a first pre-treatment step to treat cellulose pulp by chemicals, such as enzymes or, alternatively by oxidation, and a second step involving mechanical disintegration of the cellulose fibres into nano-thin fibrils.

A further important and relevant advantage of CNF as a barrier material, is the fact that it would be recyclable together with the conventional cellulose material present in any paper or carton packaging, and thus will not need to be separated from the paper stock or paper layers of a laminated packaging material.

CNF has the disadvantage of being very moisture-sensitive, losing its gas barrier properties as it absorbs moisture in a packaging material. In particular for the purpose of liquid or semi-solid packaging, this is a draw-back of CNF materials.

DISCLOSURE OF THE INVENTION

It is, accordingly, an object of the present invention to overcome or alleviate the above-described problems in barrier films and sheets for packaging including CNF as a gas barrier material.

It is also a general object of the invention to provide packaging materials for oxygen-sensitive products, such as laminated packaging materials for liquid, semi-solid or wet food products, having good gas barrier properties suitable for long-term, aseptic packaging.

Attempts have been made in the past to improve the moisture resistance of CNF materials, by means of chemical modification of the CNF material itself, such as cross-linking or chemically substituting the CNF molecules with different functional groups. Such chemical modification requires naturally an additional modification method step in the manufacturing of CNF material itself, and as such normally increases both the cost and the availability of the raw material.

It is therefore desirable to provide an alternative CNF material having further moisture resistance, in the final barrier packaging material product, by features that may be added or performed later, in the stage of manufacturing of the packaging material, thus using the raw material in its natural, original state, directly obtained from defibrillation.

It is a particular object to provide barrier films or sheets in which the gas barrier material comprises un-modified CNF fibrillar material, which films or sheets are able to resist moisture for a long time in order to provide gas barrier properties to a product, in particular a food product, packed in a packaging container comprising the barrier films or sheets.

A further object of the invention is to provide laminated packaging materials comprising such barrier films or sheets, which have a high content of renewable materials.

A further object is to provide laminated packaging materials, which are easily recyclable with as few recycled material fractions and recycling method steps needed, as possible.

A particular object, is to provide a, relative to aluminium foil barrier materials, cost-efficient, non-foil paper or paperboard laminated packaging material, having good gas barrier properties, and good water vapour barrier properties, for the purpose of manufacturing packages for long-term food storage.

Yet a further and more specific object of the invention is to provide a cost-efficient, non-foil, paper- or paperboard-based and heat-sealable packaging laminate having good gas barrier properties, good water vapour barrier properties and good internal adhesion between the layers, for the purpose of manufacturing aseptic packaging containers for long-term storage of liquid foods at maintained nutritional quality under ambient conditions.

These objects are thus attainable according to the present invention by the laminated packaging material, the packaging container and the method of manufacturing the packaging material, as defined in the appended claims.

With the term "long-term storage" in connection with the present invention, is meant that the packaging container should be able to preserve the qualities of the packed food product, i.e. nutritional value, hygienic safety and taste, at ambient conditions for at least 3 months, preferably longer, like 6 months or more, such as 12 months or more.

With the term "package integrity", is generally meant the package durability, i.e. the resistance to leakage or breakage of a packaging container. A main contribution to this property is that within a packaging laminate there is provided good internal adhesion between adjacent layers of the laminated packaging material. Another contribution comes from the material resistance to defects, such as pinholes, ruptures and the like within the material layers, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers.

According to a first aspect of the invention, the general objects are attained by a barrier sheet or film, for use in packaging of products sensitive to oxygen and other gases, having a gas barrier layer comprising cellulose nanofibrils (CNF), the gas barrier layer being vapour deposition coated with a further barrier coating on at least one side, the further vapour deposited barrier coating providing water vapour barrier properties such that the film may provide gas barrier properties also at high humidity conditions at 70% RH or more, more particularly at 80% RH or more, in a packaging material. The further vapour deposited barrier coating providing water vapour barrier properties may for example be an amorphous diamond-like carbon coating (DLC).

CNF is a material made from wood cellulose fibre, where the individual nanofibrils have been partly or fully detached from each other. CNF is normally very thin (about 20 nm) and the length is often between 100 nm and 10 μm. however, the microfibrils may also be longer, for example between 10-100 μm but lengths up to 200 μm can also be used. Fibrils of lengths in the micrometer range, and agglomerated fibrils, as well as separated fibrils and fibrils of lengths in the nanometer range, in aqueous slurry or suspension, are included in the definition of CNF.

According to one embodiment, the barrier sheet or film consists of one homogeneous layer of the gas barrier material comprising cellulose nanofibrils (CNF), which layer is coated with a vapour deposited barrier coating on at least one side, preferably on both sides, in order to encapsulate the moisture sensitive CNF material between water vapour barriers.

According to a further embodiment, the gas barrier layer in the barrier sheet or film comprises CNF and up to 25 weight-%, such as 20 weight-%, of a plasticizer compound, based on the dry weight of the layer. Suitable plasticizer compounds or additives are found among polyols, saccharides, polysaccharides such as starch, polyethylene glycols, polyvinyl alcohols, and similar substances providing hydroxyl functionality as well as a plasticizing effect to the CNF composition. Specific well functioning examples of such plasticizer compounds suitable for the purpose of food packaging, are selected from the group consisting of carboxymethyl cellulose (CMC), glycerol, polyethylene glycol (PEG) with a molecular weight from 2000 to 4000, and polyvinyl alcohols having a high degree of hydrolysis, such as 87-79%.

According to another embodiment, the barrier sheet or film comprises a substrate layer, which is dispersion coated with the gas barrier layer comprising cellulose nanofibrils (CNF). Suitable coating amounts for this embodiment are from 0.5 to 20 weight-% CNF, but the amounts of CNF may be lower in compositions also including a small amount of binder polymer as well. Suitable dispersion coating binder polymers, who also may contribute to oxygen barrier properties, are for example PVOH, vinyl acetate polymers, EVOH, acrylate polymers and copolymers, polyolefins, starch and cellulose esters. The addition of such polymer binders overlaps with the addition of plasticizer compound additives to the CNF composition, when those additives and polymers are the same.

Most preferably, however, the content of plasticizing compounds or similar polymer compounds, is not higher than 20 weight-%, and are not as such contributing much to the gas barrier properties. The gist and purpose of this invention is rather to provide the gas barrier properties by a renewable and natural resource material alone or as much as possible, and not add much of other materials. It is conceivable to add inorganic filler particles, laminar nano-clay particles and colloidal particles, to the composition, in order to improve barrier properties. However, it is desirable to avoid un-necessary composition complexity, and it is possible to obtain sufficient barrier properties from the CNF layer alone. A dispersion of the CNF composition may be applied to the substrate film or sheet, by means of roller coating, spray coating, gravure roll coating, reverse gravure coating, curtain coating and the like.

In the case where the barrier sheet or film comprises a substrate layer which is coated with the CNF gas barrier layer, the substrate layer is according to one embodiment a polymer film. In a different embodiment, the substrate layer is a paper substrate, in particular a thin paper having a surface weight of from 12 to 70 g/m2. Alternatively, the CNF coating may be coated directly onto a thicker paper or paperboard, which is forming the bulk layer in a laminated packaging material, and having a surface weight from above 70 up to 350 g/m2. Vapour deposition coating of a CNF layer that has been coated onto such thicker paperboard substrate materials is however likely not economically feasible for packaging material production today, why thinner paper substrates are most preferred.

According to one particular embodiment, the gas barrier layer is coated with said vapour deposited barrier coating on both sides, on its respective, opposite, film or sheet surfaces.

In a second aspect of the invention, a laminated packaging material comprising the barrier film or sheet of the invention is provided. The laminated packaging material may further comprise a first outermost liquid tight, heat sealable polyolefin layer and a second innermost liquid tight, heat sealable polyolefin layer.

According to one embodiment, the laminated packaging material comprises a bulk layer of paper or paperboard, or other cellulose-based bulk material, a first outermost liquid tight, heat sealable polyolefin layer, a second innermost liquid tight, heat sealable polyolefin layer and, on the inner side of the core layer of paper or paperboard, towards the inside of a packaging container made from the packaging material, between the core layer and the innermost layer, said barrier sheet or film is arranged. In a particular embodiment, the at least one vapour deposited water vapour barrier layer is positioned between said gas barrier layer and said innermost heat sealable polyolefin layer.

According to a further embodiment, the barrier sheet or film is bonded to the bulk layer by an intermediate adhesive polymer, or thermoplastic polymer bonding layer.

In a third aspect of the invention there is provided a packaging container comprising the laminated packaging material of the invention and according to a further embodiment, the packaging container is entirely made of the laminated packaging material.

Over time, various vapour deposition barrier coatings have been considered in designing packaging materials that fulfil the gas barrier criteria as well as the needs of various mechanical and other physical properties.

The vapour deposited barrier layer is applied by means of physical vapour deposition (PVD) or chemical vapour deposition (CVD), preferably by a vacuum deposition process, and preferably by a plasma-assisted or plasma-enhanced chemical vapour deposition process (PECVD) onto the substrate surface of the CNF barrier material. Other vapour deposition methods will not produce as good barrier coatings, and will either need two consecutive coating steps or will produce a coating with less good density and barrier, or both. Atmospheric plasma coating methods are, for example, known to produce low density, low barrier coatings.

The thin vapour deposited layers according to the invention are nanometer-thick, i.e. they have a thickness countable in nanometers, for example of from 1 to 500 nm (50 to 5000 Å), preferably from 1 to 200 nm, more preferably from 5 to 100 nm and most preferably from 5 to 50 nm.

Generally, below 5 nm any barrier properties are very low and above 200 nm, the coating is less flexible and, thus, more prone to cracking when applied onto a flexible substrate.

Commonly, such a vapour deposition coating having barrier properties, in particular water vapour barrier properties, is made of a metal compound or an inorganic metal compound.

According to an embodiment, a thin vapour deposited layer, substantially consisting of aluminium metal may have a thickness of from 5 to 50 nm, more preferably from 5-30 nm, which corresponds to less than 1% of the aluminium metal material present in an aluminium foil of conventional thickness, i.e. 6.3 μm. While metal vapour deposition coatings require significantly less metal material, they still provide some low barrier properties, and in particular water vapour barrier properties. Such low amounts of deposited material, does not, however, constitute a separate material fraction in recycling, and are adding barrier properties at very low amounts of raw material needed.

A step of surface treatment of the substrate film may be carried out before vapour deposition coating, for example when metallising, the substrate film, e.g. by ion bombardment of the surface.

A suitable metallised layer has an optical density (OD) of from 1.8 to 3.0, preferably from 2.0 to 2.7. At an optical density lower than 1.8, the barrier properties of the metallised film are too low. At above 3.0, on the other hand, the metallisation layer becomes too brittle, and the thermostability during the metallisation process will be too low due to higher heat load when metallising the substrate film during a longer time. The coating quality and adhesion will then be clearly negatively affected. An optimum has, thus, been found between these values, preferably between 2.0 and 2.7.

A further conceivable coating is a coating of aluminium oxide having the formula AlOx wherein x varies from 1.0 to 1.5, preferably of $Al_2O_3$. Preferably, the thickness of such a coating is from 5 to 300 nm, more preferably from 5 to 100 nm and most preferably from 5 to 50 nm.

Normally, an aluminium metallised layer inherently has a thin surface portion consisting of an aluminium oxide due to the nature of the metallisation coating process used.

A thin coating metallisation layer, or a layer of an inorganic metal compound, is preferably applied by means of vacuum vapour deposition, but may less preferably be applied also by other methods generally known in the art having a lower productivity, such as electroplating or sputtering. The most preferred metal according to the present invention is aluminium, although any other metal capable of being vacuum deposited, electroplated or sputtered may be used according to the invention. Thus, less preferred and less common metals such as Au, Ag, Cr, Zn, Ti or Cu are conceivable also. Generally, thin coatings of metal or a mixture of metal and metal oxide provide barrier properties against water vapour and are used when the desired function is to prevent water vapour from migrating into and through a multilayer film or packaging laminate. Most preferably, the metal in a metallisation or inorganic metal coating is aluminium (Al). Further examples of aluminium inorganic compounds are aluminium oxide, nitride and aluminium carbide, or a mixture of these.

Also other vapour deposited inorganic metal compound layers may be suitable for carrying out the invention. Also similar compounds from semi-metals such as silicon may be suitable for the invention and are included by the term inorganic metal compounds, as long as they are cost-efficient and are able to provide some water vapour barrier properties.

Some inorganic coatings may be applied by means of plasma enhanced chemical vapour deposition method (PECVD), wherein metal or metal compound vapour is deposited onto the substrate under more or less oxidising circumstances. Silicon oxide coatings may, for example, be applied by a PECVD process.

According to one advantageous embodiment, the vapour deposition coating may be an organic coating such as a thin carbon-based barrier layer. Such carbon-based layers are advantageously coated by means of a plasma coating process, preferably PECVD, resulting in a hydrocarbon polymer coating, referred to as amorphous carbon or diamond-like carbon (DLC) coatings. DLC defines a class of amorphous carbon material that displays some of the typical properties of diamond. Preferably, a hydrocarbon gas, such as e.g. acetylene or methane, is used as process gas in the plasma for producing the coating. Such carbon-based coatings generally provide good adhesion to adjacent polymer or adhesive layers in a laminated packaging material. Particularly good adhesion will be obtained in a laminated material, in which the vapour deposited water vapour barrier coatings are containing substantial amounts of carbon, such as in particular diamond-like carbon coatings (DLC), which exhibit good adhesion compatibility with polymers, such as polyolefins and in particular polyethylene and polyethylene-based co-polymers.

The amorphous diamond-like coating may be applied at a thickness from 2 to 50 nm, such as from 2 to 40 nm, such as from 2 to 35 nm, such as from 5 to 35 nm, such as from 10 to 30 nm.

Generally, the vapour deposition coatings described above provide barrier properties such as some lower level of gas barrier properties, but in particular also water vapour barrier properties. Coatings with good water vapour barrier properties are adequate for this invention, since the CNF material layer of the barrier film or sheet to be coated already provides a high level of gas barrier properties. Vapour deposition coatings that also provide some inherent oxygen barrier properties may of course further improve the total gas barrier property, at least under dry conditions.

Suitable thermoplastics for the outermost and innermost heat sealable liquid-tight layers are polyolefins such as polyethylene and polypropylene homo- or co-polymers, preferably polyethylenes and more preferably polyethylenes selected from the group consisting of low density polyethylene (LDPE), linear LDPE (LLDPE), single site catalyst metallocene polyethylenes (m-LLDPE) and blends or copolymers thereof. According to a preferred embodiment, the outermost heat sealable and liquid-tight layer is an LDPE, while the innermost heat sealable, liquid-tight layer is a blend composition of m-LLDPE and LDPE for optimal lamination and heat sealing properties.

The same thermoplastic polyolefin-based materials, as listed regarding the outermost and innermost layers, and in particular polyethylenes, are also suitable in bonding layers interior of the laminated material, i.e. between a bulk or core layer, such as paper or paperboard, and the barrier film. In an embodiment, the thermoplastic bonding layer may be a polyethylene layer, such as a low density polyethylene (LDPE) layer.

According to an alternative embodiment, suitable bonding or tie layers interior of the laminated material, such as for example between the bulk or core layer and the barrier film, or between the outer heat sealable layer and the barrier- or primer-coated polymer film substrate, are also so-called adhesive thermoplastic polymers, such as modified polyolefins, which are mostly based on LDPE or LLDPE co-polymers or, graft co-polymers with functional-group containing monomer units, such as carboxylic or glycidyl functional groups, e.g. (meth)acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

Corresponding modified polypropylene-based thermoplastic adhesives or bonding layers may also be useful, depending on the requirements of the finished packaging containers.

Such adhesive polymer layers or tie layers are applied together with the respective outer layer in a co-extrusion coating operation.

However, normally, the use of the above described adhesive polymers should not be necessary for bonding to a DLC-coated film of the invention. Sufficient and adequate adhesion to polyolefin layers, and in particular to polyethylene layers, as adjacent layers have been concluded, at a level of at least 200 N/m, such as at least 300 N/m.

According to an embodiment, a laminated material may thus be constructed without any conventional adhesives or primers, that need to or cure, or dry when included into the laminated structure.

Adhesion measurements were performed at room temperature with a 180° degrees peel force test apparatus (Telemetric Instrument AB), 24 h after the LDPE lamination. Peeling is performed at the DLC/LDPE interface, the peel arm being the barrier film. When needed, distilled water droplets are added to the peeled interface during peeling to assess the adhesion under wet conditions, i.e. the conditions when the laminated packaging material has been saturated with migrating moisture through the material layers, from the liquid stored in a packaging container made from the laminated material, and/or by storage in a wet or highly humid environment. The given adhesion value is given in N/m and is an average of 6 measurements.

A dry adhesion of more than 200 N/m ensures that the layers do not delaminate under normal package manufacturing conditions, e.g. when bending and fold-forming the laminated material. A wet adhesion of this same level ensures that the layers of the packaging laminate do not delaminate after filling and package formation, during transport, distribution and storage.

The interior bonding polymer layer may be coated directly onto the polymer film substrate having the DLC barrier layer coated thereon, by using common techniques and machines, e.g. those known for the lamination of an aluminum foil, in particular hot lamination (extrusion) of the polymer layer from a molten polymer. Also, using a pre-made polymer film and binding it directly to the barrier-coated carrier film by locally melting it, e.g. by applying heat with a hot cylinder or heated roller, is possible. From the above it is apparent that the DLC barrier film can be handled in a similar way to an aluminium foil barrier in the lamination and conversion methods into a laminated packaging material. The lamination equipment and methods do not require any modification, by for example adding specific adhesive polymers or binder/tie layers as may be required in previously known plasma coated materials. In addition, the new barrier film including the DLC barrier layer coated thereon can be made as thin as an aluminium foil without adversely affecting the barrier properties in the final food package.

It has been seen that when laminating a DLC barrier coating surface to an adjacent layer of e.g. polyethylene, such as LDPE, the contributing oxygen barrier properties from the barrier film are increased to a 2-3 times higher value than by measuring on the barrier film itself, only. This barrier improvement by merely laminating the durable DLC barrier coating of the invention into a laminate, cannot be explained by a simple laminate theory, according to which $$1/OTR = SUM_i(1/OTR_i)$$

but does, thus, improve the total barrier beyond the individual contribution of OTR by each laminate layer. It is believed that it is the excellent adhesion between the DLC coating and the polyolefin surface that leads to a particularly well integrated interface between the two materials, and thereby to improved oxygen barrier properties.

In a preferred embodiment of the invention, the peel force strength between the DLC barrier coating layer and the further, laminating, bonding polymer layer as measured by a 180° peel test method under dry and wet conditions (by putting water at the peeling interface)) (as described above) is higher than 200 N/m, such as higher than 300 N/m. A dry adhesion of more than 200 N/m ensures that the layers do not delaminate under normal manufacturing conditions, e.g. when bending and fold-forming the laminated material. A wet adhesion of the same level ensures that the layers of the packaging laminate do not delaminate after filling and package formation, during transport, distribution and storage.

EXAMPLES AND DESCRIPTION OF PREFERRED EMBODIMENTS

Figure 1B:
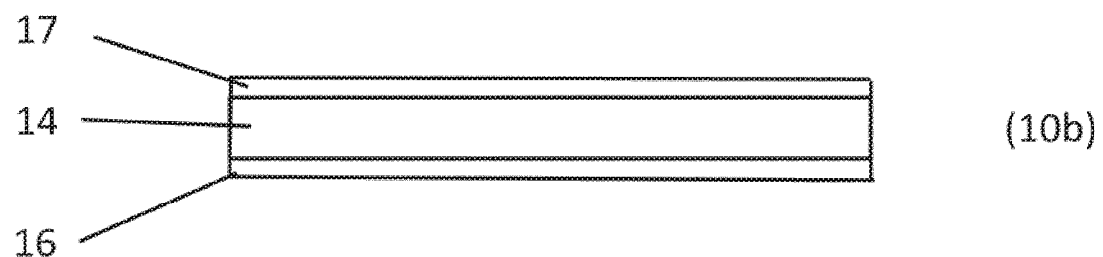
Figure 2A:
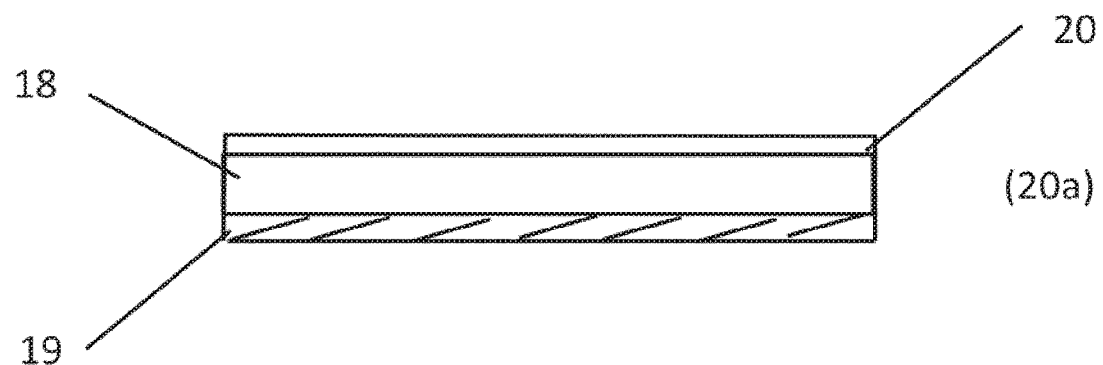
Figure 2B:
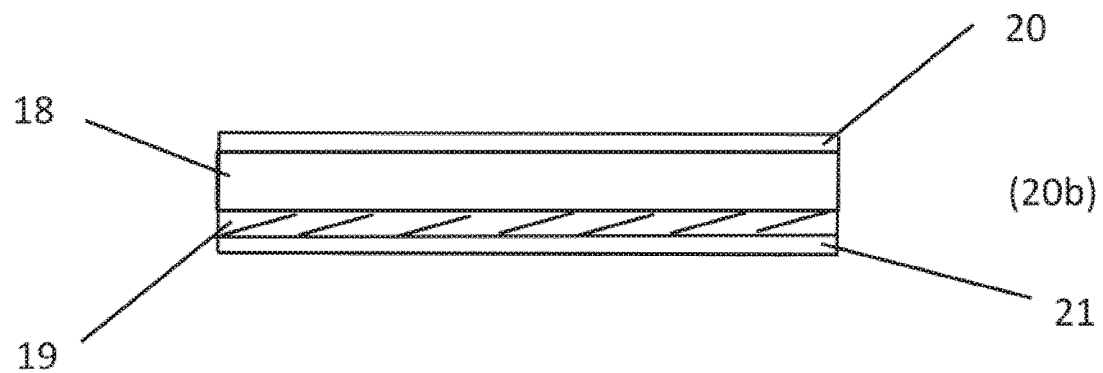
Figure 3:
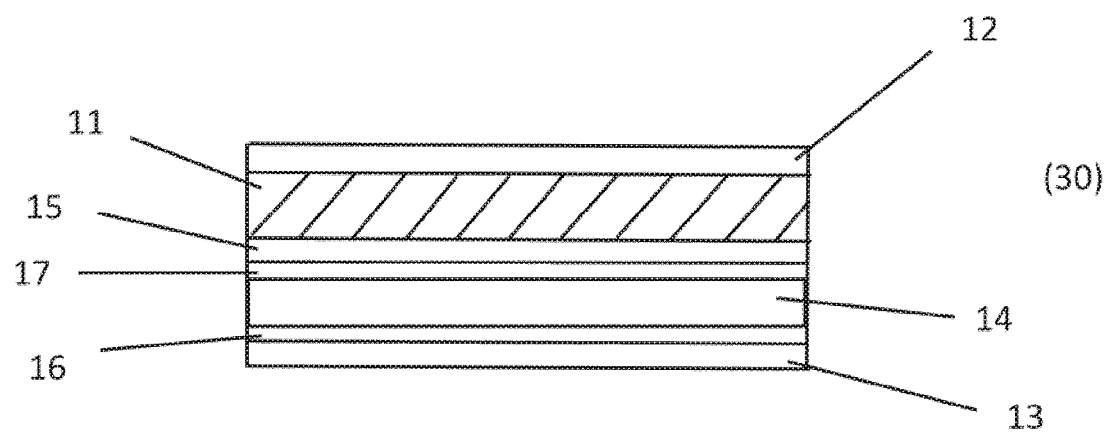
Figure 4:
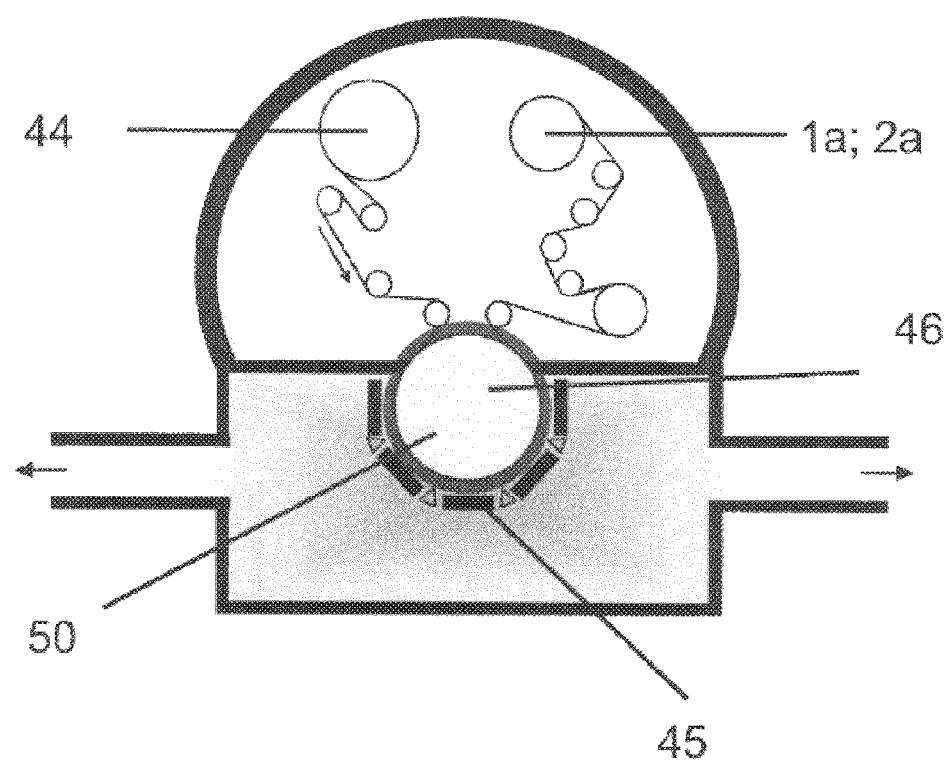
Figure 5A:
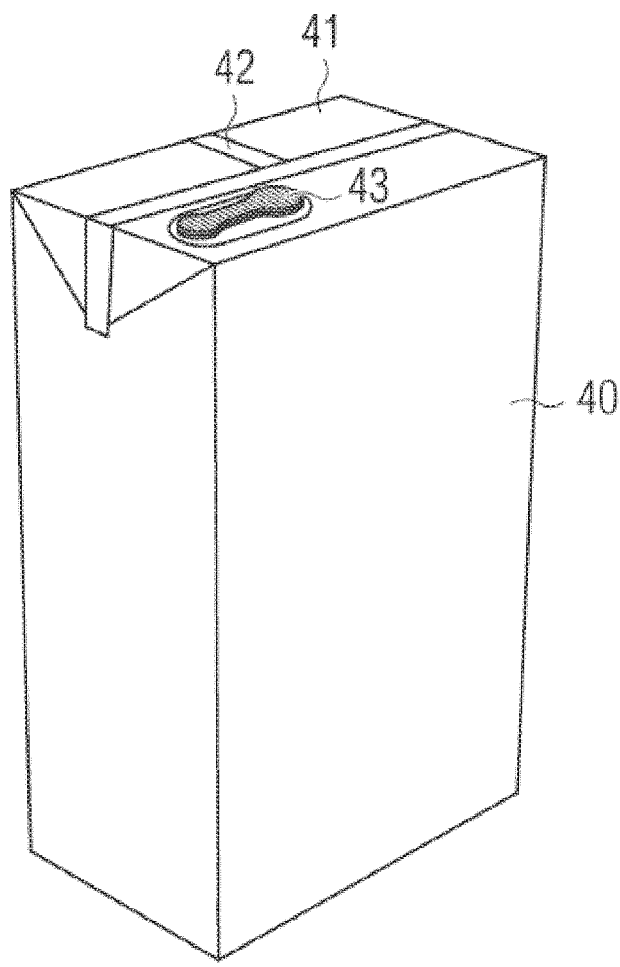
Figure 5B:
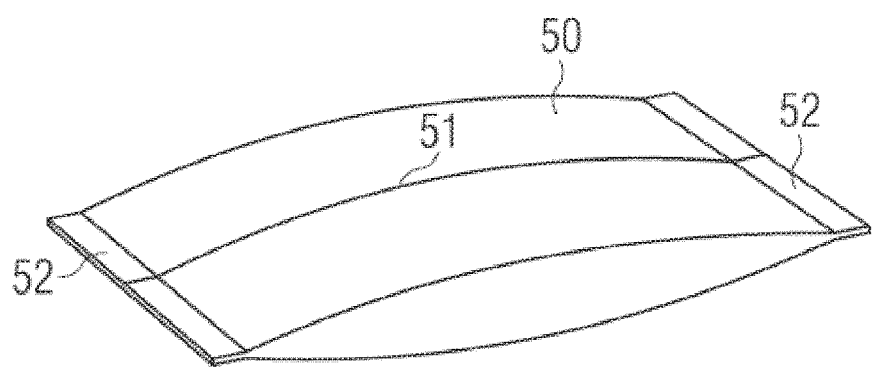
Figure 5C:
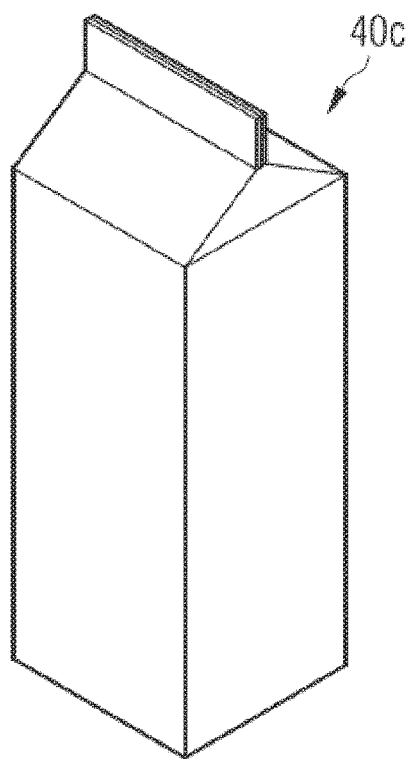
Figure 5D:
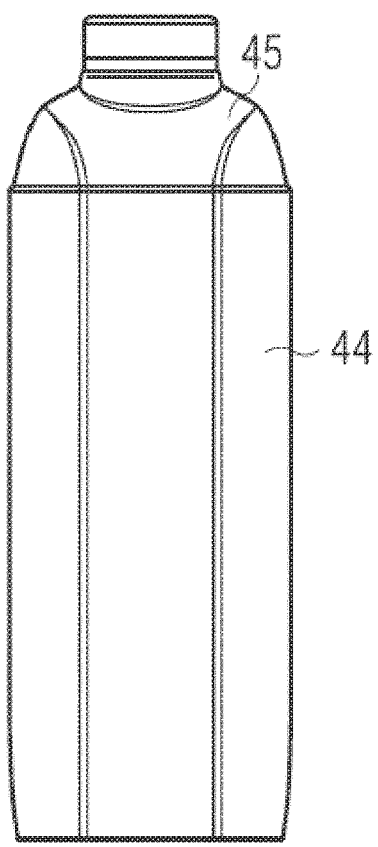
Figure 6:
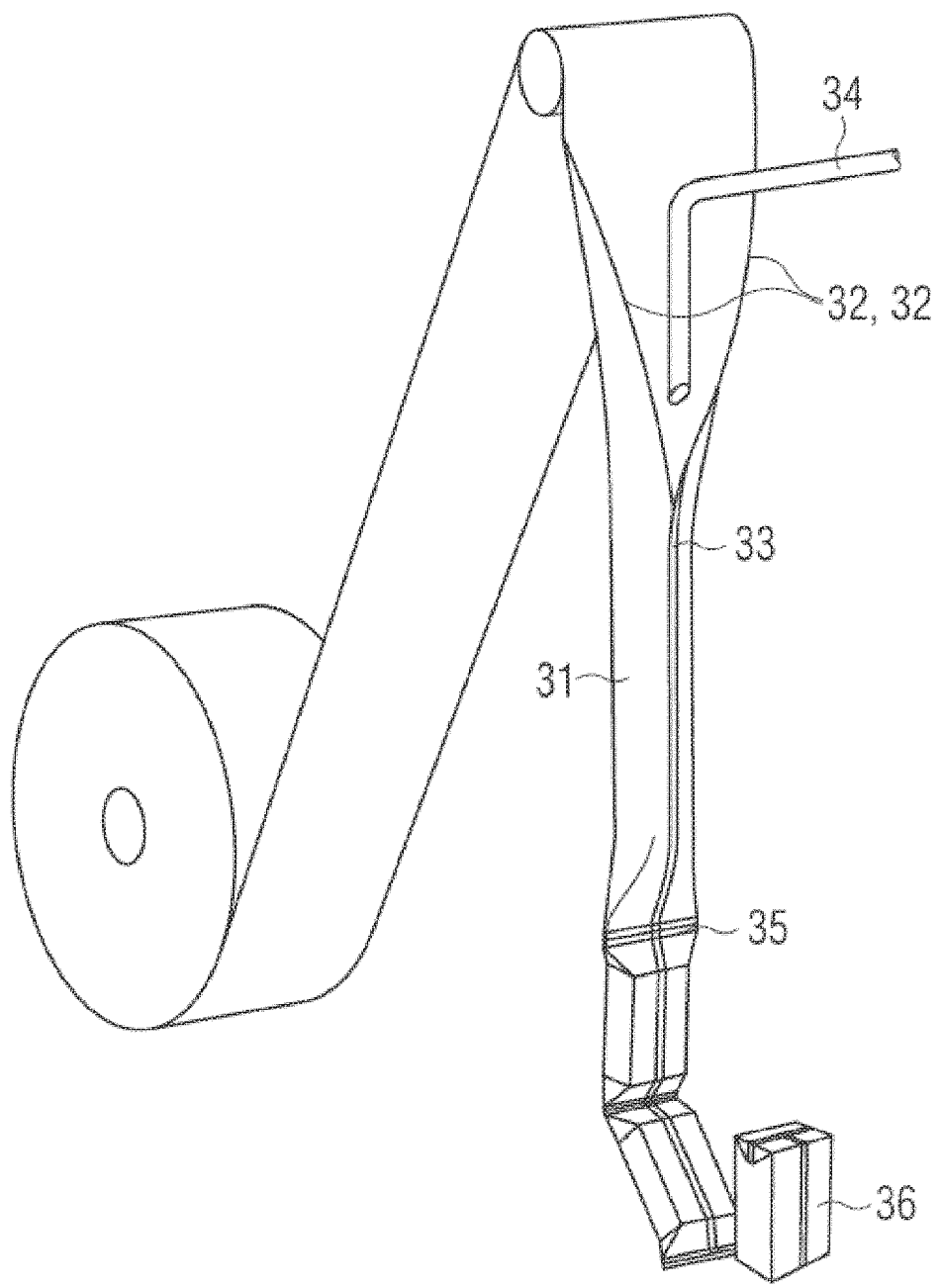
Figure 7A:
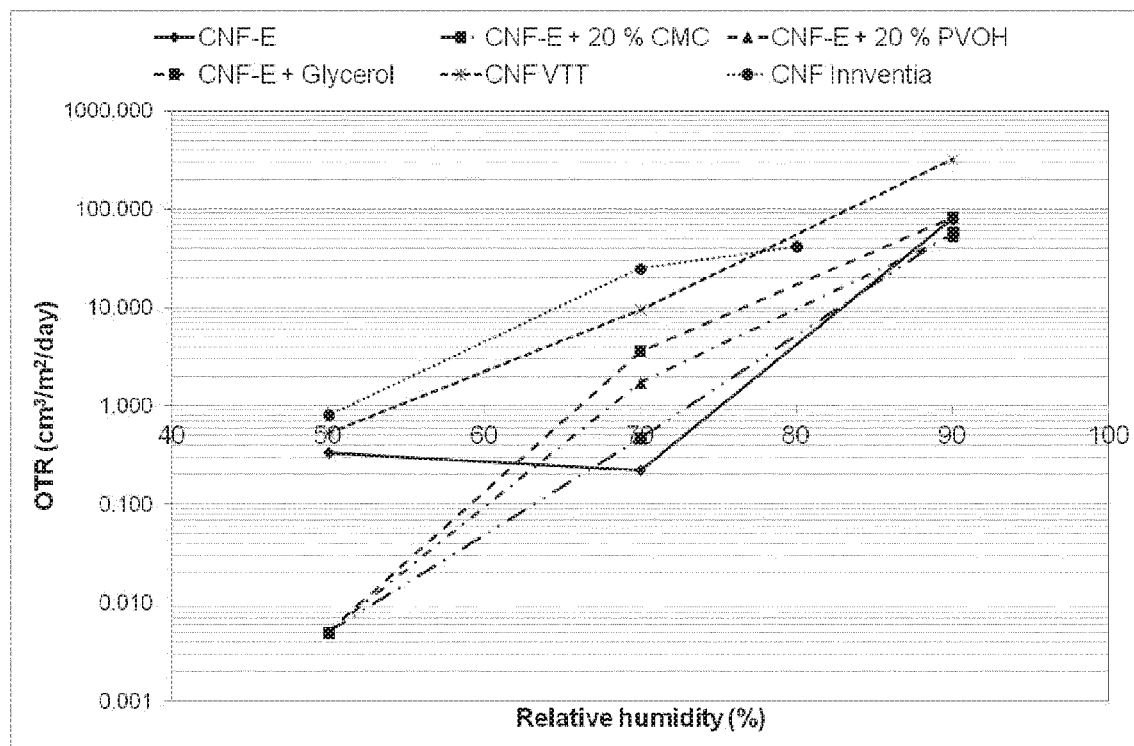
Figure 7B:
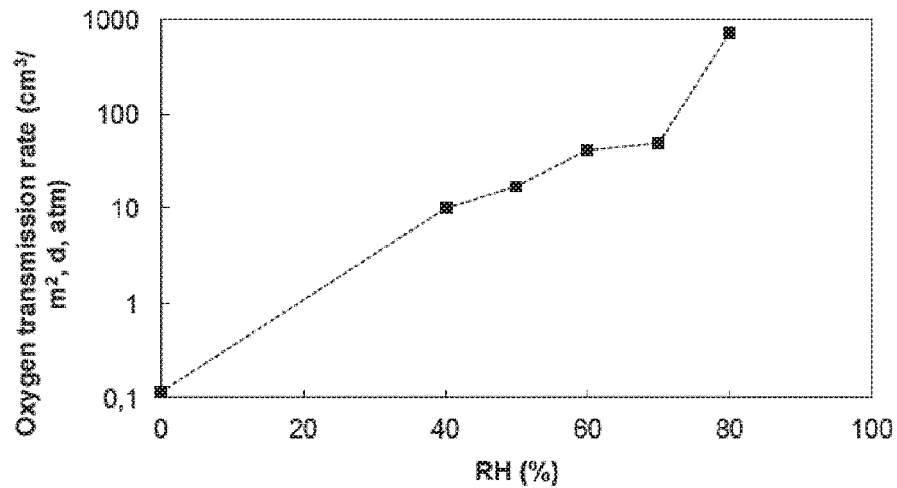
Figure 8:
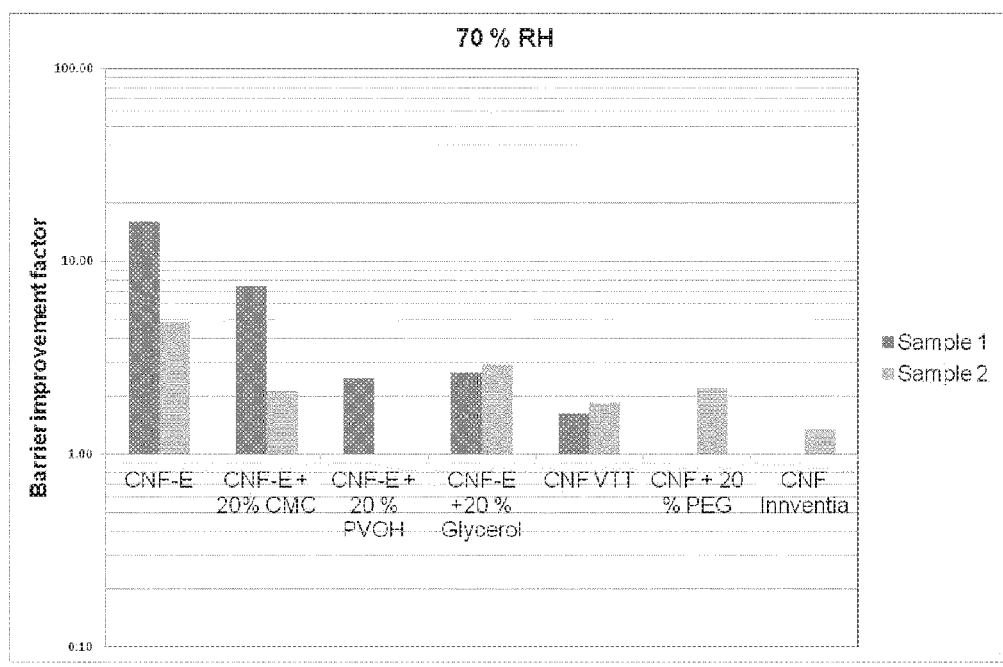
Figure 9:
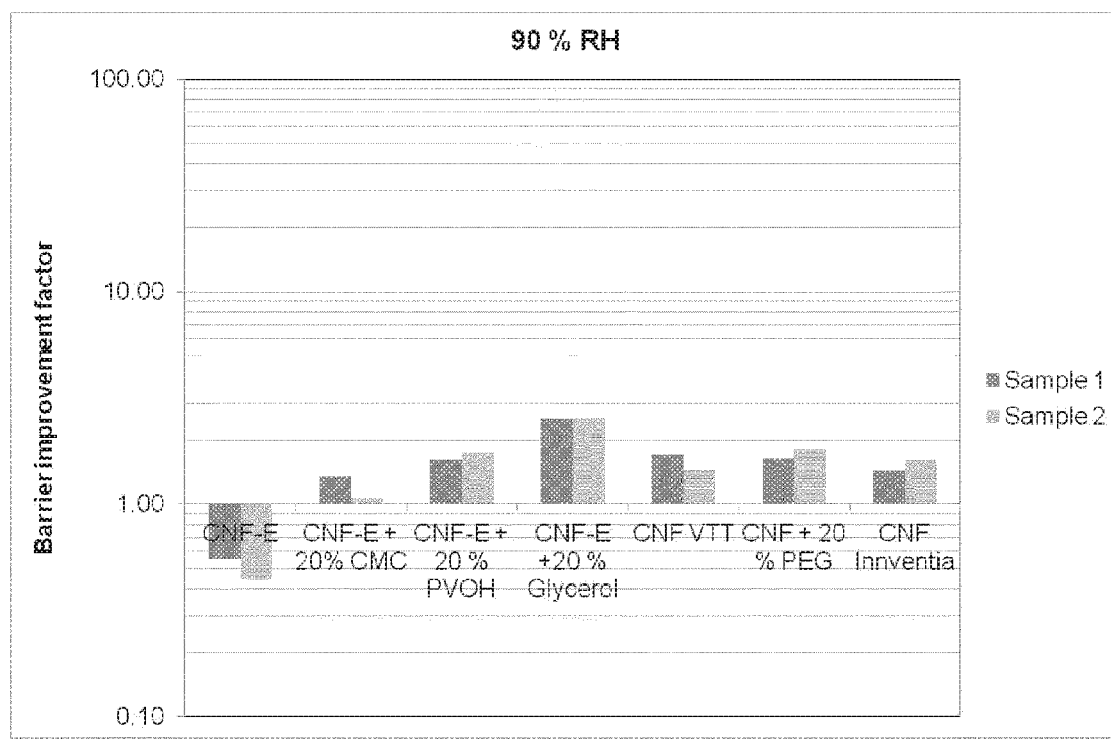
Figure 10:
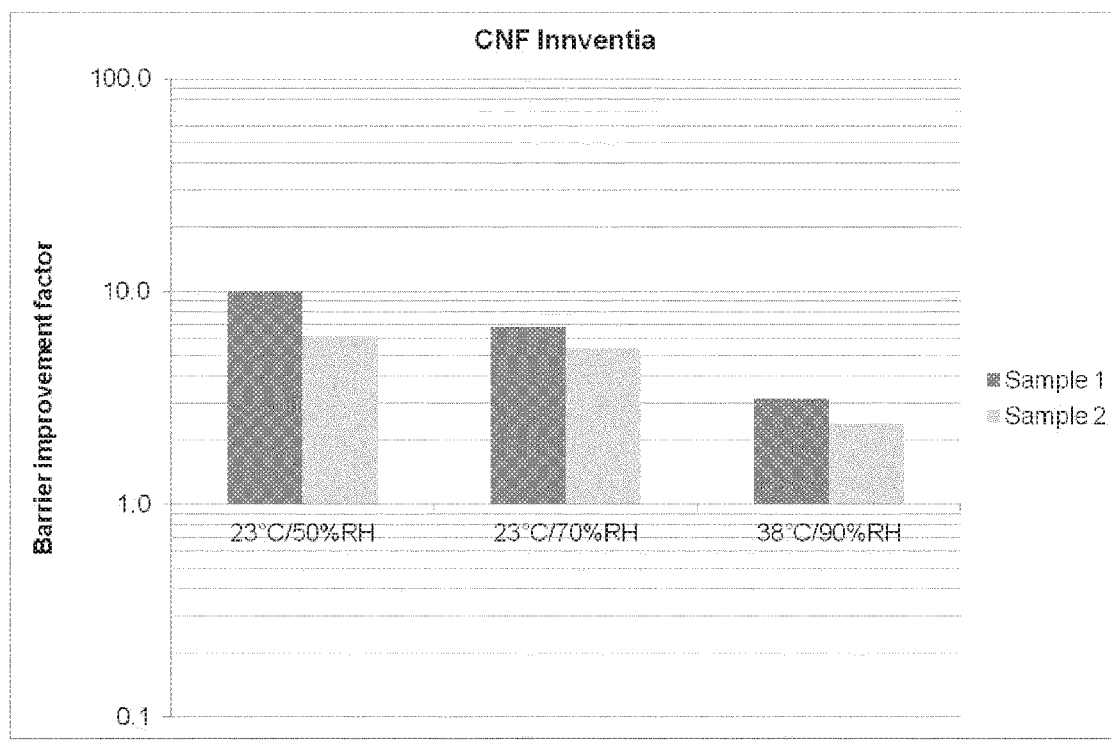
Figure 11:
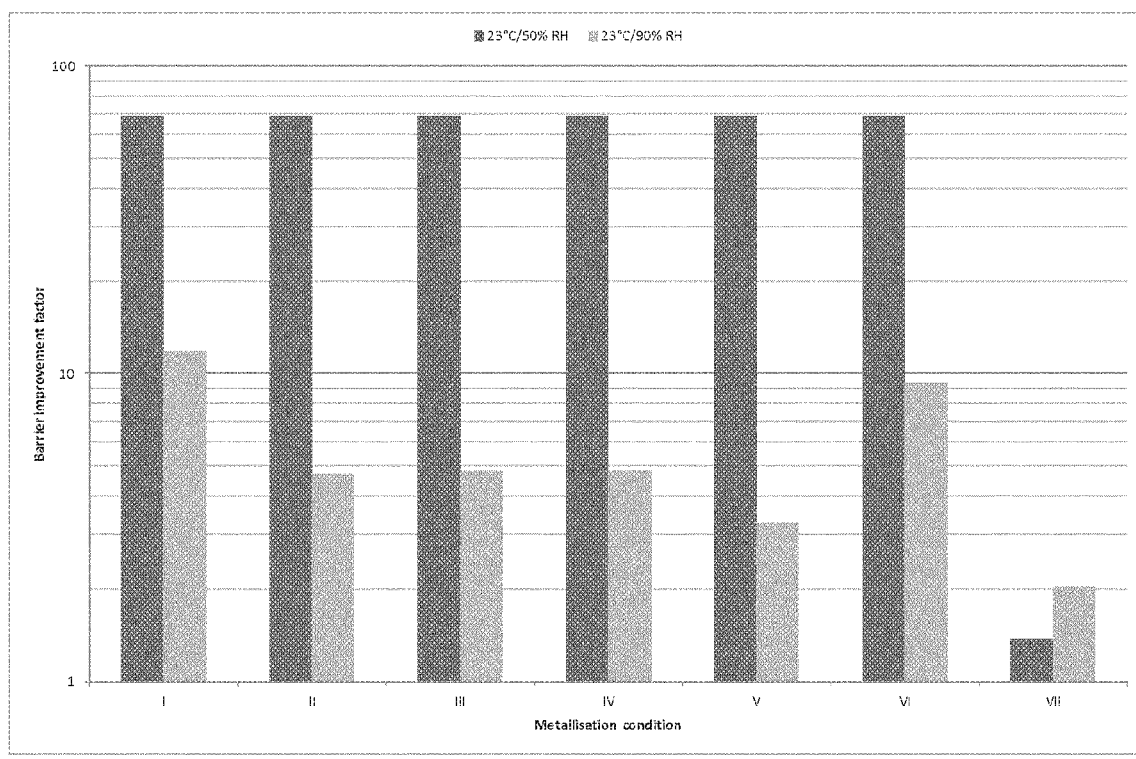

In the following, preferred embodiments of the invention will be described with reference to the drawings, of which:

FIGS. 1a and 1b are schematically showing, a barrier film or sheet in cross-section, from a pre-manufactured film comprising CNF, according to the invention, FIGS. 2a and 2b are showing a barrier film or sheet in cross-section, from a substrate layer which has been coated with a CNF barrier composition, according to the invention, FIG. 3 is showing a schematic, cross-sectional view of a laminated packaging material according to an embodiment of the invention, FIG. 4 is showing a diagrammatic view of a plant for continuous plasma enhanced chemical vapour deposition (PECVD) coating, by means of a magnetron induced plasma, onto a substrate film, FIGS. 5a, 5b, 5c and 5d are showing typical examples of packaging containers produced from the laminated packaging material according to the invention, FIG. 6 is showing the principle of how such packaging containers are manufactured from the packaging laminate in a continuous, roll-fed, form, fill and seal process, FIGS. 7a and 7b show how the OTR of the tested, starting material CNF films, as well as of the known CNF films, increase with increasing relative humidity (RH), FIG. 8 shows the relative barrier improvement, of the corresponding vapour deposition coated CNF films, as measured at 70% RH, FIG. 9 shows the relative barrier improvement, of the corresponding vapour deposition coated CNF films, as measured at 90% RH, FIG. 10 shows the relative barrier improvement, of the coated CNF film provided from Innventia AB, Sweden, as measured at 50, 70 and 90% RH, and FIG. 11 shows the barrier improvement of similar CNF films from Innventia AB that were metallised under slightly different conditions.

Figure 12:
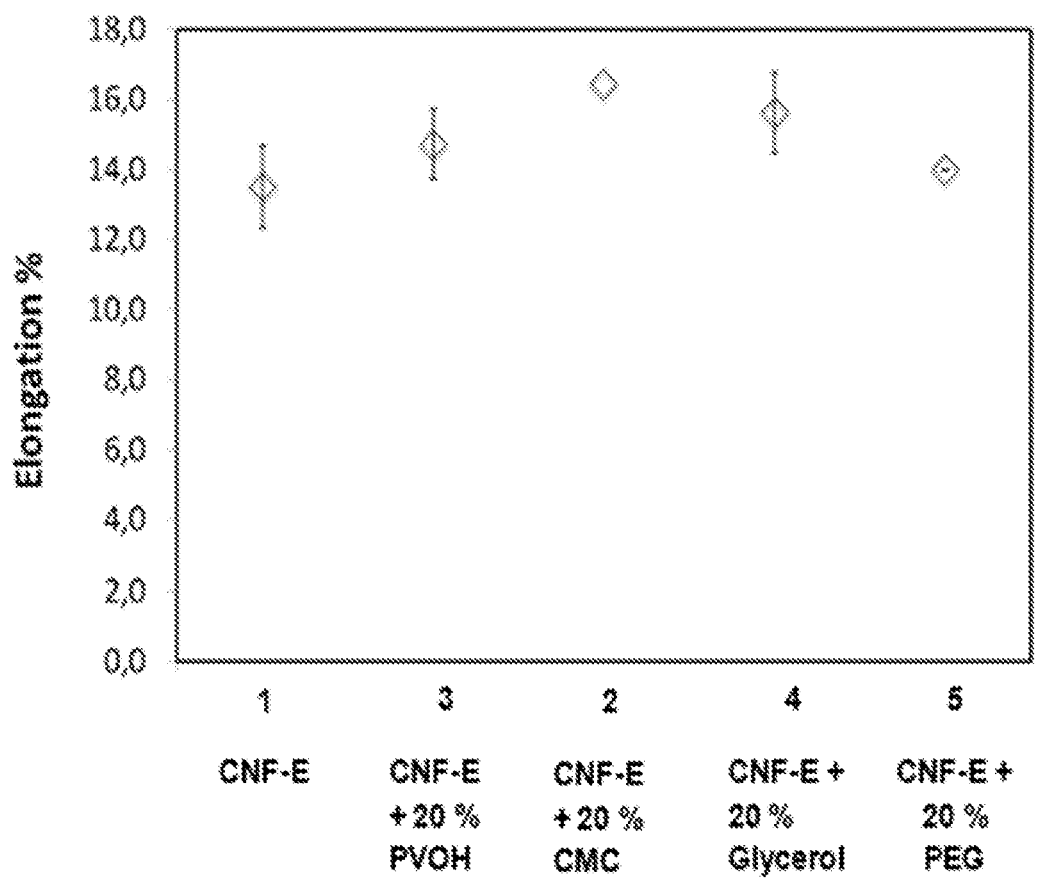

FIG. 12 shows film sample elongation.

EXAMPLES

Five different film sheet samples from cellulose nanofibrillar material (CNF) were made on a standard papermaking sheet former by filtration technique. The films obtained were between 35 and 65 μm thick and comprised 80-100 weight-% CNF and 0-20 weight-% plasticizing compound. One further, separate, film sample was taken from a roll of CNF experimental material made by VTT (VTT Technical Research Centre of Finland Ltd), the type and quantity of plasticizer being unknown of this sample. Another, separate, experimental film sample was tested, which was made from pure CNF, without any plasticizer, by Innventia AB, Sweden.

The micro-nano-fibrillar cellulose (CNF, cellulose nanofibrils) was in a first step treated by enzymatic pre-treatment of a suspension of cellulose pulp and in a further step produced by the desintegration and defibrillation treatment in the GEA® homogenizer. The basic idea of an enzymatic pre-treatment is to limit interactions between microfibrils. Cellulases such as endoglucanase and exoglucanase are used in the pre-treatment step in order to hydrolyze the cellulose polymer chains and thus weaken the fibres.

The enzyme pre-treatment helps the disintegration of cellulosic wood fibre pulp into cellulosic nanofibres. After the treatment (0.02% enzyme concentration), the fibres become well disintegrated while molecular weight and fibre length are preserved. Furthermore, enzymatic pre-treatment is environmentally friendly. It gives CNF a better structure, as it reduces the fibre length and increases the fine material extent, compared to acid hydrolysis pretreatment. Moreover, it has been showed that enzymatic pre-treatment give homogeneous CNF suspensions. Thus, enzymatic pre-treatment is a very promising method for industrial applications and full-scale CNF production.

Mechanical disintegration may be carried out by forcing the cellulose fibre suspension through a valve in a homogenizer such as a Gaulin® or GEA® homogenizer, while exposing it to high shear force and pressure, or alternatively to pass it through a grinding device, such as a Masuko® Systems grinder device.

In this particular example, the five different film samples were made from cellulose nanofibrillar pulp from Domsjö. A suspension of bleached Domsjö fibres (2.0% wt.) was produced by FCBA (Fôret Cellulose Boisconstruction et Ameublement) and CTP (Centre Technique du Papier), in Grenoble, France. The enzyme treatment was an endoglucanase treatment. The slurry was subsequently disintegrated into fibrils, using a GEA® Ariete homogenizer. The solid content of the CNF suspension was around 2.6 weight-%.

Films samples were cast from the five different compositions, excluding and including plasticizer compounds, respectively, all plasticizer compounds sourced from Sigma Aldrich. The CNF suspension was first stirred with Ultraturax for a good homogeneity and then poured in a dynamic sheet former device on top of a nitrocellulose membrane of 65 µm. Finally, the sheet formed was dried for 15 minutes at 93° C.

Films were accordingly made from:

1: A composition of the CNF-E (enzymatically treated CNF) treated in a GEA homogenizer, without any plasticizer compound added.

2: A composition of 80 weight % (calculated on dry matter) of homogenized CNF-E and 20 weight-% of CMC as plasticizer.

3: A composition of 80 weight % (calculated on dry matter) of homogenized CNF-E and 20 weight-% of PVOH, with a degree of hydrolysis of 87-89%, as plasticizer.

4: A composition of 80 weight % (calculated on dry matter) of homogenized CNF-E and 20 weight-% of glycerol as plasticizer.

5: A composition of 80 weight % (calculated on dry matter) of homogenized CNF-E and 20 weight-% of PEG (polyethylene glycol) with a molecular weight of 3400, as plasticizer.

The film samples had the thermal and mechanical properties as shown in Tables 1-2 and in FIG. 12.

TABLE 1

Thermal properties determined by thermo-gravimetric analysis (TGA).

| Sample | Film | Onset T (° C.) | Decomposition temperature $T_D$ (° C.) | Weight residue at 500° C. (%) |
|---|---|---|---|---|
| 1 | CNF - E | 245.71 | 287.71 | 23.07 |
| 2 | CNF - E + 20% CMC | 214.37 | 291.38 | 25.944 |
| 3 | CNF - E + 20% PVOH | 241.21 | 327.53 | 22.84 |
| 4 | CNF - E + 20% Glycerol | 221.41 | 330.04 | 22.87 |
| 5 | CNF - E + 20% PEG | 238.2 | 332.98 | 19.48 |

The plasticizer additives increase the melting temperatures of the films. The addition of these compounds reduces the mobility of macromolecular chains, increasing the intermolecular forces, which lead to an increase of the melting points. Indeed, a lot of heat energy was required in order to break these strong intermolecular forces. Furthermore, no significant changes were observed concerning the CNF film samples comprising CMC, glycerol and PVOH, whereas the first melting point of the CNF-E+ PEG film is the highest among all.

Moreover, in order to know the thermo stability, the decomposition temperature (TD) and the weight residue at 500° C., thermo-gravimetric analysis (TGA) was performed on the samples. The results are summarized in Table 1.

The presence of additives, compared to the 100% CNF film sample, increased the decomposition and decreased the weight residue at 500° C., except for CMC. As mentioned, the CMC is a cellulose derivative, which explains the increase in the weight residue compared to pure CNF. The increase of the decomposition temperatures show that the CNF and the additives are well interacting between each other. It also shows that the additives are well dispersed into the CNF.

Film Sample Elongation is Shown in FIG. 12.

A good elongation is really important for forming multistructure materials. The CNF films showed good elongation ability, up to 16%. There are no significant differences between the different film samples regarding this property.

TABLE 2

Young's modulus of the film samples

| Sample | Film | E (GPa) |
|---|---|---|
| 1 | CNF - E | 10.46 ± 0.6 |
| 2 | CNF - E + 20% CMC | 14.72 ± 2.5 |
| 3 | CNF - E + 20% PVOH | 14.01 ± 0.5 |
| 4 | CNF - E + 20% Glycerol | 13.62 ± 2.3 |
| 5 | CNF - E + 20% PEG | 16.35 ± 2.45 |

The additives increased the Young's modulus compared to the 100% CNF film. As seen in TGA results, the CNF and plasticizer additives are well dispersed and have a good interaction between each other. It led to an increase in Young's modulus, and provided the sample films with excellent mechanical properties.

The oxygen transmission of the untreated film samples was measured at different relative humidity, i.e. at 50, 70 and 90% RH. The results are shown in FIGS. 7a and 7b and in Table 3. The test method used to measure the oxygen transmission, OTR, is based on ASTM D3985-02 (Oxygen Gas Transmission Rate Through Plastic Film and Sheeting) and uses a coulometric sensor for oxygen detection. An Oxtran 2/21 (blue sensor) (Mocon Inc., USA) was used with a measurable permeation rate range of 0.005-200 cm³/m²/day at 50 cm2. Measurements were performed at a permeant ($O_2$) concentration of 100% and at 50%, 70% and 90% relative humidity (RH) on both sides of the sample at a temperature of 23° C. Film samples were cut out with a cutting template according to the cell size which was 5 cm². Permanent masks which use stainless steel plates sealed on both sides of the sample (Mocon Inc., USA) were used.

The samples were conditioned at the measurement conditions, 23° C., 70/80/90% RH, during 48 hours and measurement was carried out when the OTR had reached equilibrium.

The OTR of the Innventia sample film was measured by a different method, at EPFL (École Polytechnique Fédérale de Lausanne). Specimens were mounted in the two parallel chambers of an oxygen permeation analyzer (Systech 8001, accuracy of $8 \times 10^{-3}$ cm3 m$^{-2}$ day$^{-1}$ bar$^{-1}$), using a steel mask with a circular opening of 5 cm². The chambers were purged with nitrogen until baseline stabilization and the permeation test was then initiated by exposing one side of the film to a flow of pure oxygen gas. The steady-state oxygen transmission rate was recorded at different relative humidities (0, 50, 70, 80 and 90% RH) at a constant temperature of 23° C., except for the 90% RH test for which the temperature was raised to 38° C. in order to prevent condensation in the chambers. The chambers were equilibrated at each relative humidity for at least 24 h. Hence, in particular the measurements at 90% RH of the Innventia film was measured at a higher temperature of 38° C., as compared to the other OTR measurements, which all were carried out a 23° C.

As can be seen in FIG. 7a, and was known and expected from FIG. 7b (Source: Aulin, Cellulose, (2010) 17:559-574, film thickness about 5 µm), the OTR increases dramatically with increasing humidity conditions, of all uncoated film samples.

The film sheet samples were subsequently vapour deposition coated by static cryo-plasma deposition coating in a All the coating treatments provided improved oxygen barrier properties, but OTR varied between 0.4 and 2.8 cm3/m2/24 h (untreated samples 123 cm3/m2/24 h), as measured on the PET film (12 µm) control samples.

It was also concluded that there was a good agreement between OTR and WVTR, i.e. good oxygen barrier generally meant good water vapour barrier.

TABLE 3

| | | Film | Coated film sample | | | Uncoated film sample | | | BIF | BIF = uncoated OTR/coated OTR |
|---|---|---|---|---|---|---|---|---|---|---|
| Sample name | Sample Nr | thickness (µm) | 50% RH | 70% RH | 90% RH | 50% RH | 70% RH | 90% RH | 70% RH | BIF 90% RH |
| CNF-E w/o plasticizer B | 1 | 52 | 0.334 | 0.222 | 79.316 | 0.005 | 3.574 | 43.87 | 16.12 | 0.55 |
| CNF-E w/o plasticizer C | 2 | 39 | 0.005 | 0.669 | 88.777 | 0.005 | 3.232 | 39.08 | 4.83 | 0.44 |
| CNF + 20% CMC B1 | 1 | 47 | 0.005 | 0.467 | 58.075 | 0.005 | 3.455 | 78.70 | 7.40 | 1.36 |
| CNF + 20% CMC C1 | 2 | 45 | 0.005 | 1.147 | 50.094 | 0.005 | 2.458 | 53.41 | 2.14 | 1.07 |
| CNF + 20% PVOH A | 1 | 44 | 0.005 | 1.727 | 53.627 | 0.005 | 4.276 | 87.11 | 2.48 | 1.62 |
| CNF + 20% PVOH B | 2 | 44 | 0.005 | 0.005 | 32.503 | 0.005 | 2.596 | 57.05 | — | 1.76 |
| CNF + 20% Glycerol B | 1 | 49 | 0.005 | 3.589 | 82.205 | <0.005 | 9.56 | 207.31 | 2.66 | 2.52 |
| CNF + 20% Glycerol C | 2 | 49 | 0.005 | 3.591 | 82.517 | 0.046 | 10.48 | 209.24 | 2.92 | 2.54 |
| VTT CNF A | 1 | 35 | 0.528 | 9.541 | 319.110 | 0.467 | 15.48 | 546.22 | 1.62 | 1.71 |
| VTT CNF C | 2 | 35 | 0.470 | 8.619 | 325.654 | 0.222 | 15.96 | 474.25 | 1.85 | 1.46 |
| CNF + 20% PEG A | 1 | 65 | 0.005 | 0.005 | 30.909 | 0.01 | 0.99 | 50.32 | — | 1.63 |
| CNF + 20% PEG B1 | 2 | 65 | 0.005 | 1.444 | 40.368 | 0.01 | 3.17 | 73.65 | 2.20 | 1.82 |
| CNF + 20% PEG B2 | 3 | | 0.005 | 1.020 | 45.734 | | | | | |
| CNF Innventia 1* | 1 | 60 | | 3.7 | 170** | | 25 | 530** | 6.76 | 3.11 |
| CNF Innventia 2* | 2 | 60 | | 4.6 | 220 | | 25 | 530 | 5.43 | 2.41 | laboratory process and device. The static cryo-plasma technology for plasma vapour deposition coating of the film samples in the form of sheets, was selected as the method best corresponding to continuous plasma treatment of a film substrate web in a PECVD magnetron reactor, which method was not possible for the present test examples, however, due to too low amounts of available sample film material. The homogeneity and quality of the cryo-plasma reactor plasma coatings were observed to be quite even and reliable on several control film samples placed at different locations of the reactor, such as on PET (polyethylene terephthalate) control film sample substrates. The samples of Tables 1 and 2 and the film sample from VTT were thus coated by DLC carbon coatings (C:H) on both sides, and the OTR results were listed in Table 3. The OTR of the samples was measured before and after the coating operations. The film sample from Innventia (comprising CNF without any plasticizer in the composition) was coated in a separate coating experiment by a Silicon-nitride coating Si:N, also by cryoplasma.

The film samples were stored in an oven at 30° C. during at least 24 hours before the plasma coating process. The film sample was fixed on the large flat RF electrode and a polyimide mask was placed on it, in order to keep it as flat as possible during the coating treatment.

The plasma was confined by a magnetic field and the generator frequency (40 kHz) induced an ion bombardment which densified the coating. After the first coating, the samples were returned to coat also the backside. For each side, a control PET sample film was also coated, in order to control that the coating treatment had been properly performed.

After plasma coating treatment, the coated areas of the film samples showed a clear brownish colouration of the carbon C:H coating and a slight yellowish colouration of the Si:N coatings.

The Barrier Improvement Factor, BIF, defined as the ratio between the OTR of the uncoated sample and the OTR of the coated sample, was calculated for each film sample, as listed in Table 3, and shown in FIGS. 8, 9 and 10.

In conclusion, at 90%, the barrier improvement was generally at least 1.5, i.e. improved by at least 50%. The non-plasticized film sample of the five made according to our Example, was apparently damaged during plasma coating on both sides, presumably because it was too brittle and sensitive for the necessary handling during the experiments.

Metallisation Example:

A further test series was performed, in which a CNF film from VTT was coated in a laboratory metallised at Dunmore in Germany. Different conditions as regards the process pressure (vacuum) and the weight of Aluminium vapour deposited, i.e. the optical density, were tried in seven different test runs, as shown in Table 4. Sheets of the film of size A4 were coated. Measurement of the oxygen barrier was done only in one reading point in the middle of the sample sheet. The Barrier Improvement Factor was calculated as previously, and the values obtained at 50% RH and 90% RH, respectively, are shown in FIG. 11.

It is then seen that the improvement is at least a factor 1.5, or 50%, as reported above, and in most of the test runs more like 3-4, i.e. 300-400%.

TABLE 6

| Metallisation condition | OD before metallisation | OD after metallisation |
|---|---|---|
| I | 0.1 | 3.15 |
| II | 0.1 | 2.92 |
| III | 0.1 | 1.87 |
| IV | 0.1 | 1.98 |

TABLE 6-continued

| Metallisation condition | OD before metallisation | OD after metallisation |
|---|---|---|
| V | 0.1 | 2.35 |
| VI | 0.1 | 1.84 |
| VII | 0.1 | 3.08 |

Altogether, the results show that it is possible to improve OTR of CNF barrier films at high relative humidity such as 70-90% RH, by coating or entirely encapsulating or enclosing the CNF material layer between thin vapour deposition coatings. The vapour deposition coating functions as a barrier towards migrating moisture, i.e. water vapour migration, and preserve the good oxygen barrier of the CNF material layer, which is a desirable effect in laminated packaging materials intended for sensitive products under wet conditions, e.g. for packaging of liquid food. For best effect possible in a liquid paperboard laminated packaging material, the water vapour barrier, i.e. the vapour deposition coating, is obviously placed at least on the side of the CNF film or layer, which is directed towards the inside of a packaging container made from the packaging material.

EXAMPLES—DLC LAMINATE ADHESION TEST

Films from 12 μm thick biaxially oriented polyethylene-terephthalate (BOPET Hostaphan RNK12 and RNK12-2DEF by Mitsubishi) were deposition coated with various coatings by plasma enhanced chemical vapour deposition (PECVD) under vacuum conditions, in a roll-to-roll plasma reactor. A diamond-like amorphous hydrogenated carbon coating, DLC, was coated on some film samples, in line with the invention, while other PECVD barrier coatings were coated on other samples. The other PECVD barrier coatings, subject of comparative examples, were SiOx, wherein x varied between 1.5 and 2.2, SiOxCy coatings and SiOx-CyNz coatings, respectively, wherein (y+z)/x is from 1 to 1.5. These other silicon-containing barrier coatings were formed from organosilane pre-cursor gas compounds. The film samples according to the invention, were coated by depositing an amorphous, hydrogenated diamond-like coating DLC from a plasma formed from pure acetylene gas.

The plasma employed was capacitively coupled to the power delivered at 40 kHz frequency, and magnetically confined by unbalanced magnetron electrodes placed at a distance from the circumferential surface of a rotating drum, which functioned as a combined film-web transporting means and electrode. The polymer film substrate was cooled by cooling means within the drum web-transporting means.

The DLC coating was in a first example applied to a thickness of about 15-30 nm, and in a second example to a thickness of only about 2-4 nm.

The SiOx coatings were coated to a thickness of about 10 nm.

The thus barrier-coated substrate film samples, were subsequently extrusion coated with a 15 g/m2 thick layer of low density polyethylene (LDPE), of a type corresponding to LDPE materials of the laminate bonding layer that is conventionally used in order to extrusion laminate paperboard to aluminium foil in liquid carton packaging laminates.

The adhesion between the thus extrusion coated LDPE layer and the barrier-coated substrate PET film, was measured by a 180° peel test method under dry and wet conditions (by putting distilled water at the peeling interface) as described above. An adhesion of more than 200 N/m ensures that the layers do not delaminate under normal manufacturing conditions, e.g. when bending and fold-forming the laminated material. A wet adhesion of this same level ensures that the layers of the packaging laminate do not delaminate after filling and package formation, during transport, distribution and storage.

TABLE 5

| Coating type | Oxygen Barrier | Water Vapour Barrier | PE-laminate Peel force (N/m) Dry adhesion | PE-laminate Peel force (N/m) wet adhesion |
|---|---|---|---|---|
| SiOx (x = 1.5-2.2) | <3 cc at 3 δ Mean 1.5 cc | N/A | 40-50 | 0 |
| SiOxCy (y/x = 1-1.5) | <3 cc at 3 δ Mean 1.5 cc | 1 | 40-50 | 40-50 |
| SiOxCyNz (y + z/x = 1-1.5) | <3 cc at 3 δ Mean 1.5 cc | 1 | 200-300 | 100 |
| DLC ~25 nm | <3 cc at 3 δ Mean 1.5 cc | 0.8 | 350-400 | 350-400 |
| DLC ~25 nm on both sides of film | 0.5 ± 0.05 | 0.5 | 350-400 | 350-400 |
| DLC 2-4 nm | 60-80 | 5-6 | 350-400 | 350-400 |
| DLC 2-4 nm on both sides of film | 60-80 | 5-6 | 350-400 | 350-400 |

OTR was measured with Oxtran 2-60 (Mocon Inc.) equipment based on coulometric sensors, with a standard deviation of the results being ±0.5 cm$^3$/m$^2$/day.

The method for determining OTR identifies the amount of oxygen per surface and time unit at passing through a material at a defined temperature, given atmospheric pressure, and chosen driving force.

Water vapour transmission rate (WVTR) measurements were carried out by a Lyssy instrument (norm: ASTM F1249-01 using a modulated Infrared sensor for relative humidity detection and WVTR measurement) at 38° C. and 90% driving force. This test method is dedicated to measure Water Vapor Transmission Rate (WVTR) properties of films. The procedure is done according to ASTM F1249-01 using a modulated Infrared sensor for relative humidity detection and WVTR measurement.

As can be seen from the results summarised in Table 1, there is some insufficient dry adhesion between pure SiOx barrier coatings and there onto extrusion coated LDPE, while the adhesion deteriorates completely under wet/humid conditions.

When experimenting with more advanced SiOx formulas, containing also carbon and nitrogen atoms, some improvement is seen in the dry and/or wet adhesion properties, as compared to the pure SiOx coating, but the wet adhesion properties remains lower, i.e. below 200 N/m.

The dry adhesion of a DLC coating to extrusion coated LDPE is slightly better than for the best of the tested SiOxCyNz coatings. The more important and unforeseeable difference, compared to the SiOxCyNz coatings is that the adhesion remains constant under wet or humid conditions, such as are the conditions for laminated beverage carton packaging.

Furthermore, and rather surprisingly, the excellent adhesion of DLC coatings at values above 200 N/m, remain unaffected also when the DLC coating is made thinner, and as thin as 2 nm, i.e. where there is actually no notable barrier properties obtained any longer. This is the case both regarding dry and wet conditions for the sample films.

Of course, when such films are laminated into packaging laminates of paperboard and thermoplastic polymer materials, it is advantageous to coat a DLC coating on both sides of the film, in order to provide excellent adhesion on both sides of the film. Alternatively, the adhesion to adjacent layers on the opposite side of the substrate film, may be secured by a separately applied chemical primer composition, such as the 2 DEF® primer from Mitsubishi. A DLC adhesion-promoting layer is preferable from both environmental and cost perspective, since it only involves carbon atoms in the adhesion layer, and since it may be made very thin in order to just provide adhesion, or thicker in order to provide also barrier properties. At any thickness of a DLC-coating, the adhesion obtained is at least as good as that of a chemical primer (such as the 2 DEF® from Mitsubishi) under both dry and wet conditions. Double-sided applications of DLC coatings onto the polymer film substrate would have to be carried out in two consecutive process steps, however.

Example 2

A similar BOPET film to the one used in Example 1 was coated with similar thin DLC coatings on one and two sides, as shown in FIG. 12. OTR was measured as cc/m$^2$/day/atm at 23° C. and 50% RH, by the same method as in Example 1. The DLC-coated films were subsequently laminated into packaging material structures including a paperboard with an outer LDPE layer, by means of a bonding layer of 15 g/m$^2$ of LDPE, and by being further coated on the opposite side of the film with an inside layer of a blend of LDPE and mLLDPE at 25 g/m$^2$. The OTR was measured on the laminated packaging material by the same method as described previously.

Subsequently, the laminated packaging materials were reformed into 1000 ml standard Tetra Brik® Aseptic packaging containers, on which the total oxygen transmission was further measured, by a Mocon 1000 equipment at 23° C. and 50% RH.

TABLE 6

| Test ID | Film structure | Thickness DLC 1 coating (nm) | Thickness DLC 2 coating (nm) | OTR Film (mean) | OTR packaging material (mean) | OTR Package (mean) |
| --- | --- | --- | --- | --- | --- | --- |
| A | /BOPET/DLC2/ | — | 3.4 | 21.8 | — | — |
| A | /DLC1/BOPET/DLC2/ | 11.9 | 3.4 | 1.1 | 1.6 | 0.037 |
| B | /BOPET/DLC2/ | — | 3.4 | 19.3 | — | — |
| B | /DLC1/BOPET/DLC2/ | 3.5 | 3.4 | 10.5 | 1.8 | 0.027 |

Very surprisingly, it was found that when measured on laminated packaging material, and on packages from the packaging material, the oxygen barrier properties were on the same level or even improved by the film of Test B, although the film in Test B was coated with only two very thin DLC coatings, while in Test A, one of the coatings was thicker and actually intended for providing the resulting oxygen barrier properties of the film. By the measurements on the barrier-coated films, the film of Test A was indeed better, but when laminated into a final laminated packaging material structure, and used in a packaging container, both the two films were performing very well, and the film of Test B was even performing better than the film of Test A. This advantageous effect of very thin DLC coatings providing both oxygen and water vapour barrier properties, especially when coated on both sides of a film will be correspondingly useful also regarding CNF films, and will when laminated into packaging materials provide excellent adhesion to adjacent laminate layers, as well as package integrity.

Thus, by the DLC-coated barrier films described above, high-integrity packaging laminates are provided, which have maintained excellent adhesion between layers also when used in liquid packaging, i.e. at subjecting the packaging material to wet conditions, and which may consequently protect other layers of the laminate from deterioration, in order to provide as good laminated material properties as possible. Since the durable DLC coatings in accordance with the invention provide both good oxygen barrier properties and water vapour barrier properties, it is a highly valuable type of barrier coating to be used in carton package laminates for liquid food products.

In FIG. 1a, there is shown, in cross-section, a first embodiment of a barrier film 10a, of the invention. The film was entirely made from a CNF composition layer 14 including a plasticizer additive at about 20 weight-% based on dry matter, and was subsequently coated on one side by plasma enhanced vapour deposition coating 16, by means of cryo-plasma technology, in order to improve the oxygen barrier (decrease the OTR value) at high humidity conditions such as 70-90% RH. The vapour deposited coating was a carbon coating (C:H) which was evenly coated to a brownish transparent coating colour.

In FIG. 1b, the same CNF film was vapour deposition coated on both sides 16, 17. The OTR of the film was measured before and after vapour deposition coating on both sides, and the barrier improvement factor, BIF, was calculated as the ratio between the uncoated OTR value and the coated OTR value, and determined to a BIF value of at least 1.5, i.e. an improvement by at least 50%, at severely humid conditions, i.e. 90% RH.

In FIG. 2a, a similar film 20a is made by dispersion coating a CNF composition layer 18 onto a thin polymer substrate film 19, and subsequently drying it. The CNF layer surface was then coated by plasma enhanced vapour deposition coating 20, by means of cryoplasma technology, in order to improve the oxygen barrier (decrease the OTR value) at high humidity conditions such as 70-90% RH.

In FIG. 2b, the same film as of FIG. 2a, was vapour deposition coated on both sides 20, 21.

FIG. 3 shows a laminated packaging material for liquid carton packaging comprising a CNF barrier film according to the invention. The laminated material comprises a paperboard core layer 11, having a bending force of 320 mN, and further comprises an outer liquid tight and heat sealable layer 12 of polyolefin applied on the outside of the core layer 11, which side is to be directed towards the outside of a packaging container produced from the packaging laminate. The polyolefin of the outer layer 12 is a conventional low density polyethylene (LDPE) of a heat sealable quality, but may include further similar polymers, including LLDPEs. An innermost liquid tight and heat sealable layer 13 is arranged on the opposite side of the core layer 11, which is to be directed towards the inside of a packaging container produced from the packaging laminate, i.e. the layer 13 will be in direct contact with the packaged product. The thus innermost heat sealable layer 13, which is to form the strongest seals of a liquid packaging container made from the laminated packaging material, comprises one or more in combination of polyethylenes selected from the groups consisting of LDPE, linear low density polyethylene (LLDPE), and LLDPE produced by polymerising an ethylene monomer with a C4-C8, more preferably a C6-C8, alpha-olefin alkylene monomer in the presence of a metallocene catalyst, i.e. a so called metallocene-LLDPE (m-LLDPE).

The core layer 11 is laminated to a CNF barrier film 14, which is coated on both sides with a thin vapour deposited layer of amorphous carbon, 16 & 17, at a thickness of from 10 to 30 nm. The thus vapour deposition coated film 14 is laminated to the core layer by an intermediate layer 15 of bonding thermoplastic polymer or by an adhesive, in this particular example by a low density polyethylene (LDPE). The intermediate bonding layer 15 is formed by means of extrusion laminating the core layer and the vapour deposited CNF film to each other. The thickness of the intermediate bonding layer 15 is preferably from 7 to 20 µm, more preferably from 12-18 µm. The innermost heat sealable layer 13 may consist of two or several part-layers of the same or different kinds of LDPE or LLDPE or blends thereof. Particularly good adhesion will be obtained in a laminated material, in which the vapour deposited water vapour barrier coatings are containing substantial amounts of carbon, such as in particular such amorphous carbon coatings or diamond-like carbon coatings (DLC), which exhibits good adhesion compatibility with polymers, such as polyolefins and in particular polyethylene and polyethylene-based co-polymers.

FIG. 4 is a diagrammatic view of an example of a plant for plasma enhanced vapour deposition coating, PECVD, of amorphous carbon coatings onto a substrate film. The film 44 is subjected, on one of its surfaces, to continuous PECVD, of a plasma, 50, created between magnetron electrodes 45, and a chilled film-transporting drum 46, from one or more gaseous organic hydrocarbon, such as acetylene or methane, and the coating is applied to a thickness of 5-500 nm, preferably 5-100 nm, such that a film 1a or 2a is formed, respectively. By turning the film and carrying out the same coating operation once more, on the other side of the above coated film 1a or 2a, a film 1b or 2b is formed, respectively.

FIG. 5a shows an embodiment of a packaging container 50 produced from the packaging laminate 10a according to the invention. The packaging container is particularly suitable for beverages, sauces, soups or the like. Typically, such a package has a volume of about 100 to 1000 ml. It may be of any configuration, but is preferably brick-shaped, having longitudinal and transversal seals 51a and 52a, respectively, and optionally an opening device 53. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

FIG. 5b shows an alternative, preferred example of a packaging container 50b produced from the packaging laminate 10b according to the invention. Since the packaging laminate 10b is thinner by having a thinner paper core layer, it is not dimensionally stable enough to form a parallellepipedic or wedge-shaped packaging container, and is not fold formed after transversal sealing 52b. It will thus remain a pillow-shaped pouch-like container and be distributed and sold like this.

FIG. 5c shows a gable top package 40c, which is formed from a pre-cut sheet or blank, from the laminated packaging material comprising a core layer of paperboard and the CNF barrier film of the invention. Also flat top packages may of course be formed from similar blanks of material.

FIG. 5d shows a bottle-like package, which is a combination of a sleeve formed from a pre-cut blank of the laminated packaging material of the invention, and a top, which is formed by injection moulding plastics in combination with an opening device such as a screw cork or the like. These types of packages are for example marketed under the trade names of Tetra Top® and Tetra Evero®. Those particular packages are formed by attaching the moulded top 45 with an opening device attached in a closed position, to a tubular sleeve 44 of the laminated packaging material, sterilizing the thus formed bottle-top capsule, filling it with the food product and finally fold-forming the bottom of the package and sealing it.

FIG. 6 shows the principle as described in the introduction of the present application, i.e. a web of packaging material is formed into a tube 31 by the longitudinal edges 32 of the web being united to one another in an overlap joint 33. The tube is filled 34 with the intended liquid food product and is divided into individual packages by repeated transversal seals 35 of the tube at a pre-determined distance from one another below the level of the filled contents in the tube. The packages 36 are separated by incisions in the transversal seals and are given the desired geometric configuration by fold formation along prepared crease lines in the material.

The invention is not limited by the embodiments shown and described above, but may be varied within the scope of the claims.

The invention claimed is:

1. A laminated packaging material for use in packaging of products sensitive to oxygen and other gases, comprising:
    a bulk layer of paper or paperboard or other cellulose-based material,
    a first outermost, liquid tight, heat sealable polyolefin layer,
    a second innermost, liquid tight, heat sealable polyolefin layer, and
    a barrier sheet or film comprising cellulose nanofibrils (CNF) and optionally a plasticizer compound,
    wherein the barrier sheet or film is arranged on the inner side of the bulk layer of paper or paperboard or other cellulose-based material, between the bulk layer of paper or paperboard or other cellulose-based material and the second innermost, liquid tight, heat sealable polyolefin layer,
    wherein the barrier sheet or film is coated on at least one side with a first vapor deposition barrier coating of an amorphous diamond-like carbon (DLC),
    wherein said vapor deposition barrier coating of an amorphous DLC is arranged between said barrier sheet or film and said second innermost, liquid tight, heat sealable polyolefin layer, and
    wherein the vapor deposition barrier coating has water vapor barrier properties, whereby the barrier sheet or film provides gas barrier properties at high humidity conditions in the laminated packaging material.

2. The laminated packaging material as claimed in claim 1, wherein the barrier sheet or film is a substrate layer coated with the CNF and optionally the plasticizer compound, and wherein the substrate layer is further coated with the vapor deposition barrier coating.

3. The laminated packaging material as claimed in claim 2, wherein the substrate layer is a polymer film.

4. The laminated packaging material as claimed in claim 2, wherein the substrate layer is a paper substrate having a grammage from 12-70 g/m².

5. The laminated packaging material as claimed in claim 1, wherein the barrier sheet or film comprises only one vapor deposition barrier coating on one side.

6. The laminated packaging material as claimed in claim 1, wherein the barrier sheet or film comprises up to 25 weight-% of the plasticizer compound, based on the dry weight of the layer.

7. The laminated packaging material as claimed in claim 6, wherein the plasticizer compound is selected from the group consisting of polyols, saccharides, polysaccharides, cellulose derivatives, polyethylene glycols and polyvinyl alcohols.

8. The laminated packaging material as claimed in claim 6, wherein the plasticizer compound is selected from the group consisting of carboxymethyl cellulose (CMC), glycerol, polyethylene glycol (PEG) with a molecular weight from 2000 to 4000, and polyvinyl alcohols having a high degree of hydrolysis.

9. The laminated packaging material as claimed in claim 1, wherein the barrier sheet or film is coated with said vapor deposition barrier coating on both sides.

10. The laminated packaging material as claimed in claim 1, wherein a thickness of the DLC coating is from 2 to 40 nm.

11. The laminated packaging material according to claim 1, wherein the barrier sheet or film is bonded to the bulk layer by an intermediate adhesive or a polymer bonding layer.

12. A packaging container comprising the laminated packaging material as claimed in claim 1.

13. The laminated packaging material as claimed in claim 1, wherein the barrier sheet or film is a film of the CNF and the plasticizer compound.

* * * * *